No. 891,172.  
PATENTED JUNE 16, 1908.

E. HOPKINSON & T. MIDGLEY.  
WHEEL RIM.  
APPLICATION FILED JULY 5, 1906.

Witnesses  
Raphaël Netter  
Gilbert Gannon

Ernest Hopkinson Inventors  
Thomas Midgley  
By their Attorney  
Baxter Morton

UNITED STATES PATENT OFFICE.

ERNEST HOPKINSON, OF EAST ORANGE, NEW JERSEY, AND THOMAS MIDGLEY, OF HARTFORD, CONNECTICUT; SAID HOPKINSON ASSIGNOR TO THE HARTFORD RUBBER WORKS COMPANY, OF HARTFORD, CONNECTICUT, A CORPORATION OF CONNECTICUT.

WHEEL-RIM.

No. 891,172.   Specification of Letters Patent.   Patented June 16, 1908.

Application filed July 5, 1906. Serial No. 324,762.

*To all whom it may concern:*

Be it known that we, ERNEST HOPKINSON, a citizen of the United States, residing in East Orange, Essex county, New Jersey, and THOMAS MIDGLEY, a citizen of the United States, whose residence is Hartford, Connecticut, have invented a new and useful Improvement in Wheel-Rims, of which the following is a specification.

This invention relates to wheel rims and more especially to wheel rims adapted to receive and retain pneumatic tires.

The principal object of the invention is to produce a wheel rim of such construction that a pneumatic tire of the double tube type may be applied to or removed from the rim in the shortest possible time and yet held in position upon the rim without danger of accidental displacement.

Other objects of the invention will appear as the structure of the improved wheel rim is hereinafter described in connection with the accompanying drawings forming part of the specification, and the scope of the invention will be clearly defined in the appended claims.

Described in general terms, the invention consists of a wheel rim provided with side flanges one or both of which are removable, the removable flange or flanges being contractible and expansible and being provided with means for effecting the contraction and expansion, which means consists of a short rod which is oppositely threaded adjacent to its ends for engagement with corresponding threads in the ends of the side flange of the wheel rim, a worm pinion fast upon the rod between the threaded portions, and a worm suitably supported for engagement with the worm pinion and adapted to impart rotative movement thereto.

Figure 1:
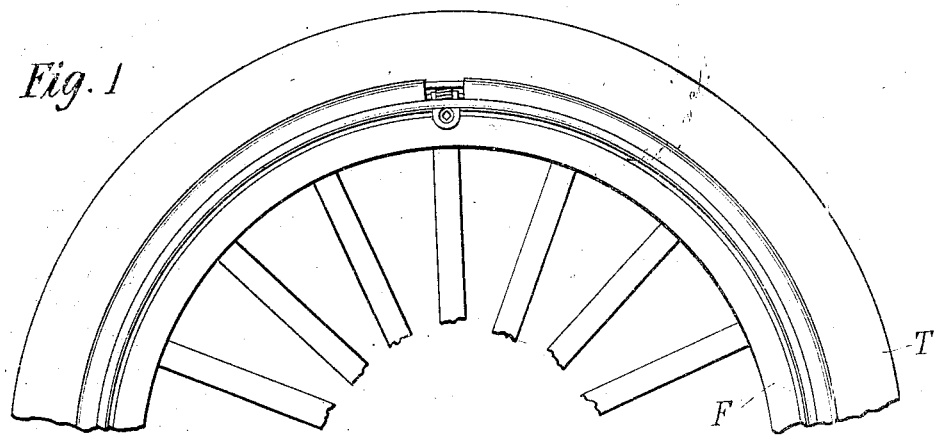
Figure 2:
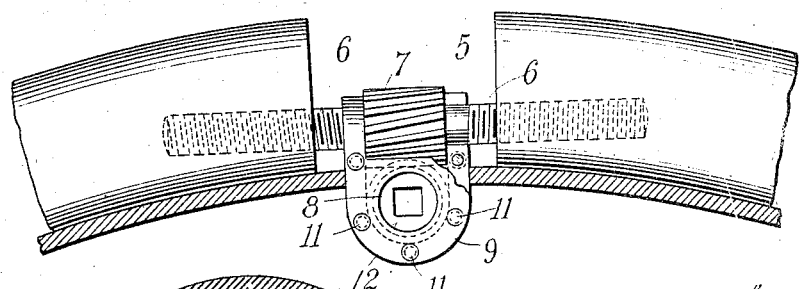
Figure 3:
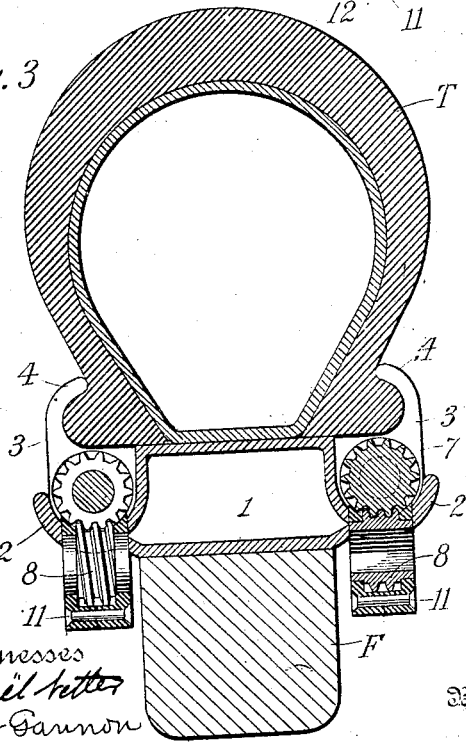
Figure 4:
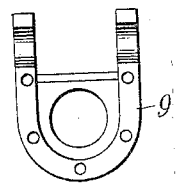
Figures 5, 6:
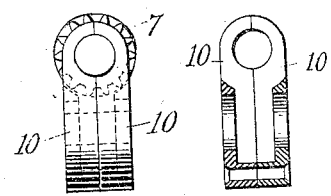

In the drawings: Figure 1 is a fragmentary view in side elevation of a vehicle wheel provided with the improved wheel rim and having a tire mounted thereon. Fig. 2 is a detail view in elevation of the ends of the side flange and of the device for contracting and expanding the side flange, the side flange being shown in position upon the main rim member, which is shown in section. Fig. 3 is a transverse sectional view through the improved wheel rim, the wheel felly, and a pneumatic tire mounted on the wheel rim, the section being taken in a plane passing through the devices for contracting and expanding the side flanges. Figs. 4, 5 and 6 are detail views illustrating the construction of the device for expanding and contracting the side flange.

Referring to the drawings by the reference characters marked thereon, F designates a wheel felly of ordinary construction, T designates the tire and 1 designates the main member of the wheel rim. This main rim member is provided with lateral channels 2 which afford seats for the removable side flanges 3, each of which is preferably provided with an overhanging portion 4 adapted to engage one of the beads of a "clencher" pneumatic tire, and the flanges and main rim member are so designed that the overhanging portions 4 project outward beyond the tire seating surface of the main rim member to an extent sufficient to coöperate in forming a suitable seat for the base of the tire and to allow sufficient space beneath the base of the tire for the devices employed to effect the contraction and expansion of the side flanges.

Each device for contracting and expanding a side flange consists of a short straight rod 5 threaded adjacent to each end, the threads adjacent to one end being the reverse of those adjacent to the other, so that the rotation of the rod 5 in one direction will tend to draw the ends of the side flange together, thereby contracting it, and rotation in the opposite direction will force the ends of the side flange apart, thereby expanding it. Between the threaded portions 6 of the rod 5 a worm pinion 7 is provided which is rigidly associated with the rod and may be formed integral therewith. This worm pinion 7 meshes with a worm 8 which is preferably supported in a hanger or stirrup 9 carried by the rod 5. This hanger or stirrup is preferably composed of two similar members 10 which are securely fastened together by means of rivets 11 and is so secured on the rod 5 that the latter is free to turn without imparting movement to the hanger or stirrup. The worm 8 is provided with lateral extensions which turn in bearings afforded by the two hanger members 10 and has a polygonal socket 12, shown in this instance as square, for the reception of a suitably shaped shank or tang on a socket wrench. The stirrup or hanger 9 extends through a slot or aperture formed in the bottom of one of the channels 2 at the sides of the main rim member so as to leave the socket 12 of the worm unobstructed and to permit of the ready introduction of the wrench employed in turning the worm.

The mode of applying or removing a tire from the improved wheel rim will be readily understood by any one skilled in the art. Assuming that the tire is in position on the rim as shown in Figs. 1 to 3, in order to remove the tire one of the side flanges 3 is expanded by introducing a wrench into the socket 12 and turning it toward the right. When the side flange has been expanded sufficiently it is disengaged from the channel 2 at a point opposite the expanding and contracting device, which then permits the tsirrup of the expanding and contracting device to be disengaged from the aperture in which it is engaged in the channel of the wheel rim. The side flange being removed, the tire can be slipped off the wheel without difficulty. When the tire is replaced in position the side flange is secured by reversing the operations enumerated. The stirrup of the expanding and contracting device is brought into engagement with the slot therefor in the channel of the wheel rim and the side flange, which is sufficiently expanded for the purpose, is then slipped into position in the channel and contracted by turning the worm 8 toward the left by means of the wrench.

It will be observed that the operation of removing or applying one of the side flanges to the wheel rim can be performed very expeditiously, as a few turns of the worm engaging the worm pinion on the threaded rod is sufficient to expand or contract the side flange to the extent necessary to effect this removal or to secure it firmly in the seat afforded therefor by the channel on the main rim member. It will also be observed that the expanding and contracting device for each side flange is so located that it does not interfere in any way with the seating of the tire on the wheel rim and does not project laterally beyond the margins of the main rim member, but is entirely protected by the channel in which the side flange is seated from contact with curbing or other objects at the sides of the wheel.

The particular advantage afforded by the improved construction over wheel rims with contractive and expansive side flanges as hitherto constructed is found in the ready access to the expanding and contracting device afforded by the improved construction and in the fact that the operation of the expanding and contracting device is continuous after the introduction of the wrench and does not require the removal and reintroduction of the wrench after every partial turn of 90° to 120°, as in the expanding and contracting devices hitherto employed in connection with the side flanges of wheel rims of the kind to which this invention relates.

Having thus described our invention, what we claim as new and desire to secure by Letters Patent is:

1. In a wheel rim, the combination with a main rim member, of a removable side flange, means for contracting and expanding said side flange, said means comprising a member threaded adjacent to each end, the threads at one end being opposite in direction to those at the other end and adapted to engage threaded sockets in the ends of the side flange, a worm pinion fixed on said member, and a worm in mesh with said worm pinion.

2. In a wheel rim, the combination with a main rim member and a removable side flange, of means for contracting and expanding said side flange, said means comprising a short rod threaded adjacent to its ends and engaging threaded sockets in the ends of the side flange, the threads adjacent to one end of said rod being opposite in direction to those adjacent to the other end, a worm pinion rigidly associated with said rod between the threaded portions, and a worm suspended from said rod and in mesh with said worm pinion.

3. In a wheel rim, the combination with a main rim member and a removable side flange, of means for expanding and contracting said side flange, said means comprising a short rod threaded adjacent to its ends and engaging threaded sockets at the ends of the side flange, the threads at one end of the rod being opposite in direction to those at the other end, a worm pinion rigidly associated with each rod between the threaded portions, a stirrup or hanger loosely suspended from said rod so that the rod may turn therein, and a worm journaled in said stirrup or hanger and meshing with the worm pinion on said rod.

4. In a wheel rim, the combination with a main rim member and a removable side flange, of means for expanding and contracting said side flange, said means comprising a rod arranged between the ends of the side flange and in threaded engagement therewith, said threaded engagement being such that rotation of the rod in one direction will expand the side flange and rotation in the other direction will contract it, a worm pinion rigidly associated with said rod, and a worm in mesh with said worm pinion, said worm being provided with a polygonal socket for the reception of a socket wrench.

In testimony whereof, we have signed our names in the presence of witnesses.

ERNEST HOPKINSON.
THOMAS MIDGLEY.

Witnesses as to the signature of Ernest Hopkinson:
  BAXTER MORTON,
  GILBERT GANNON.

Witnesses as to the signature of Thomas Midgley:
  J. D. ANDERSON,
  M. C. STOKES,